Patented Mar. 13, 1923.

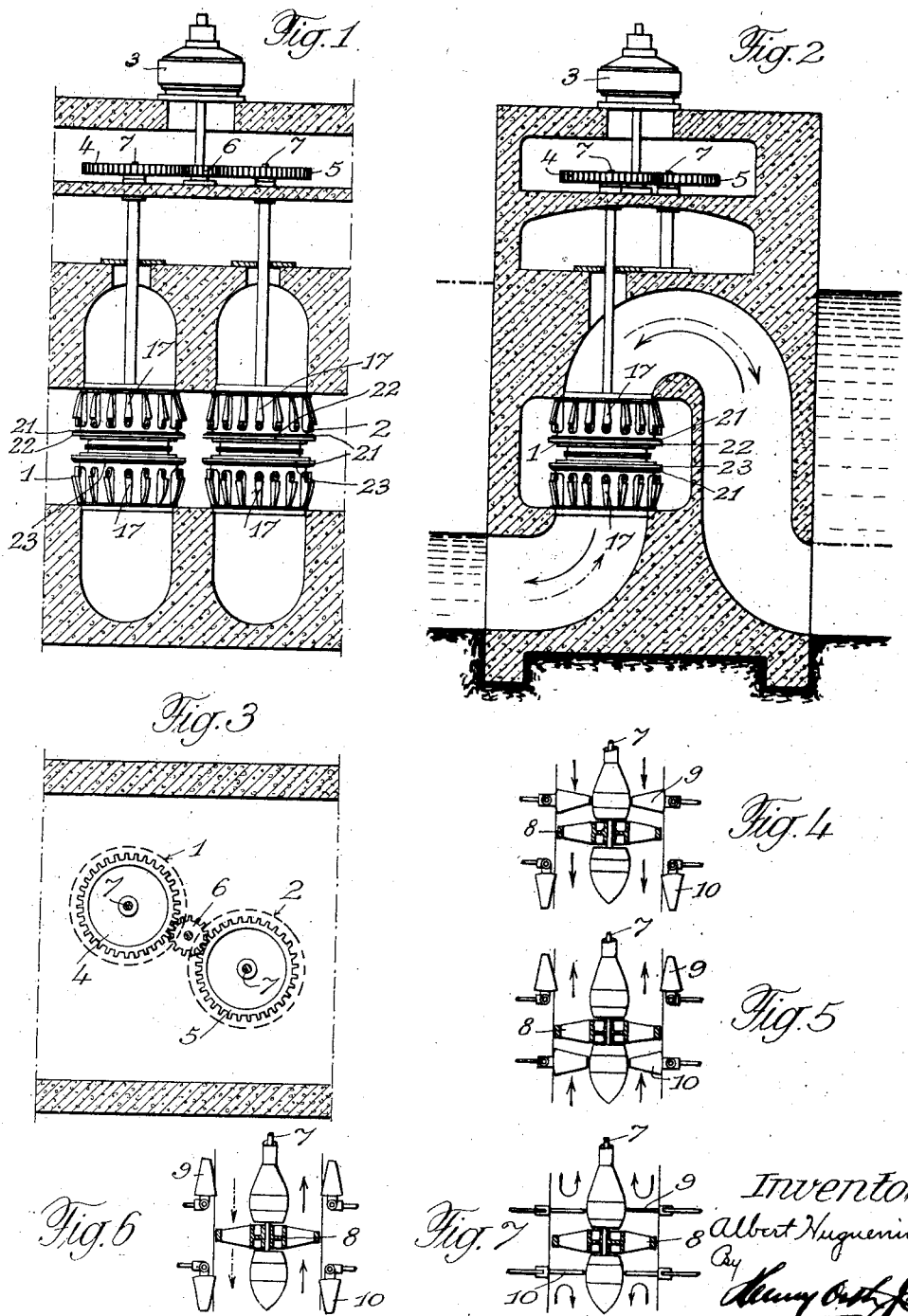

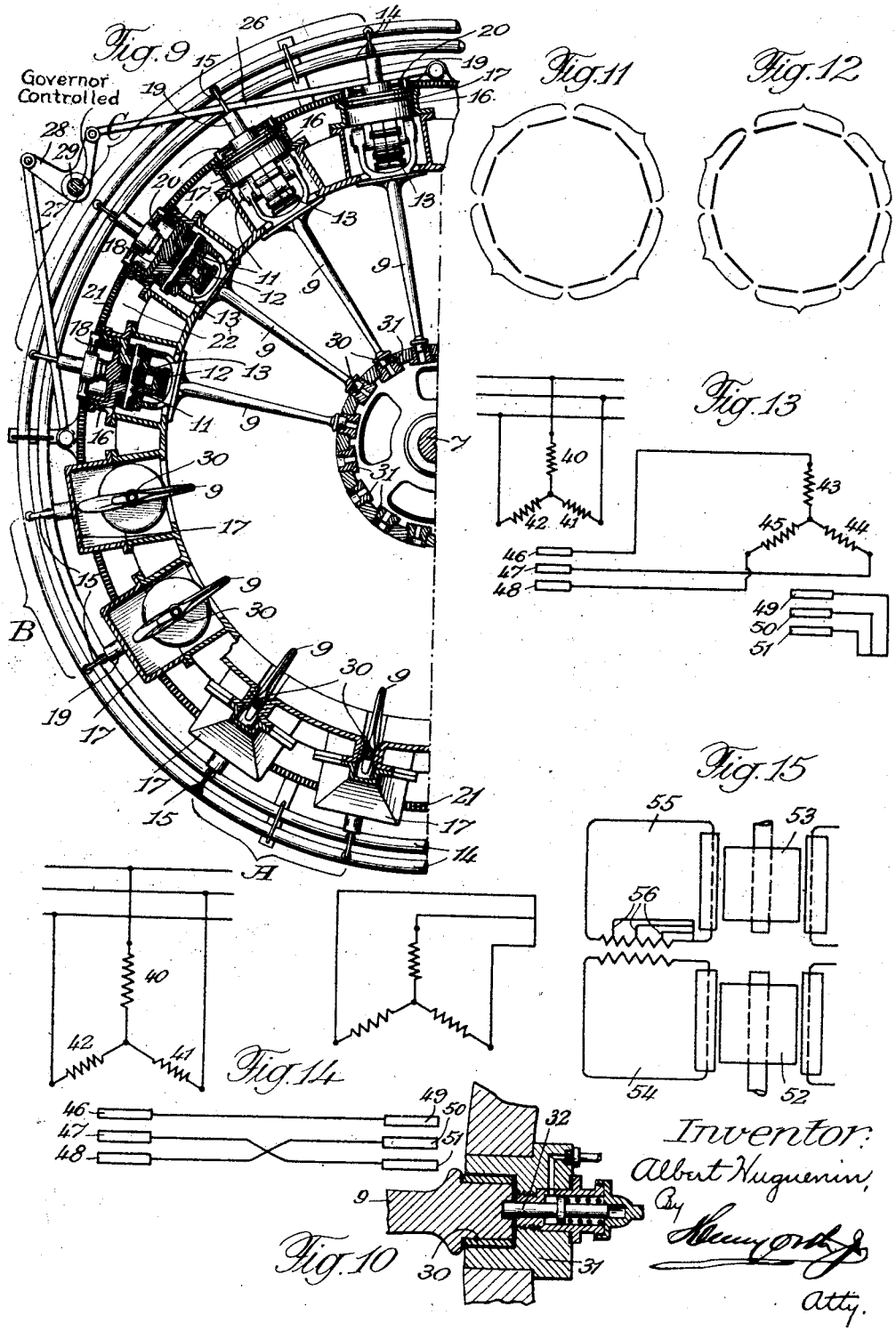

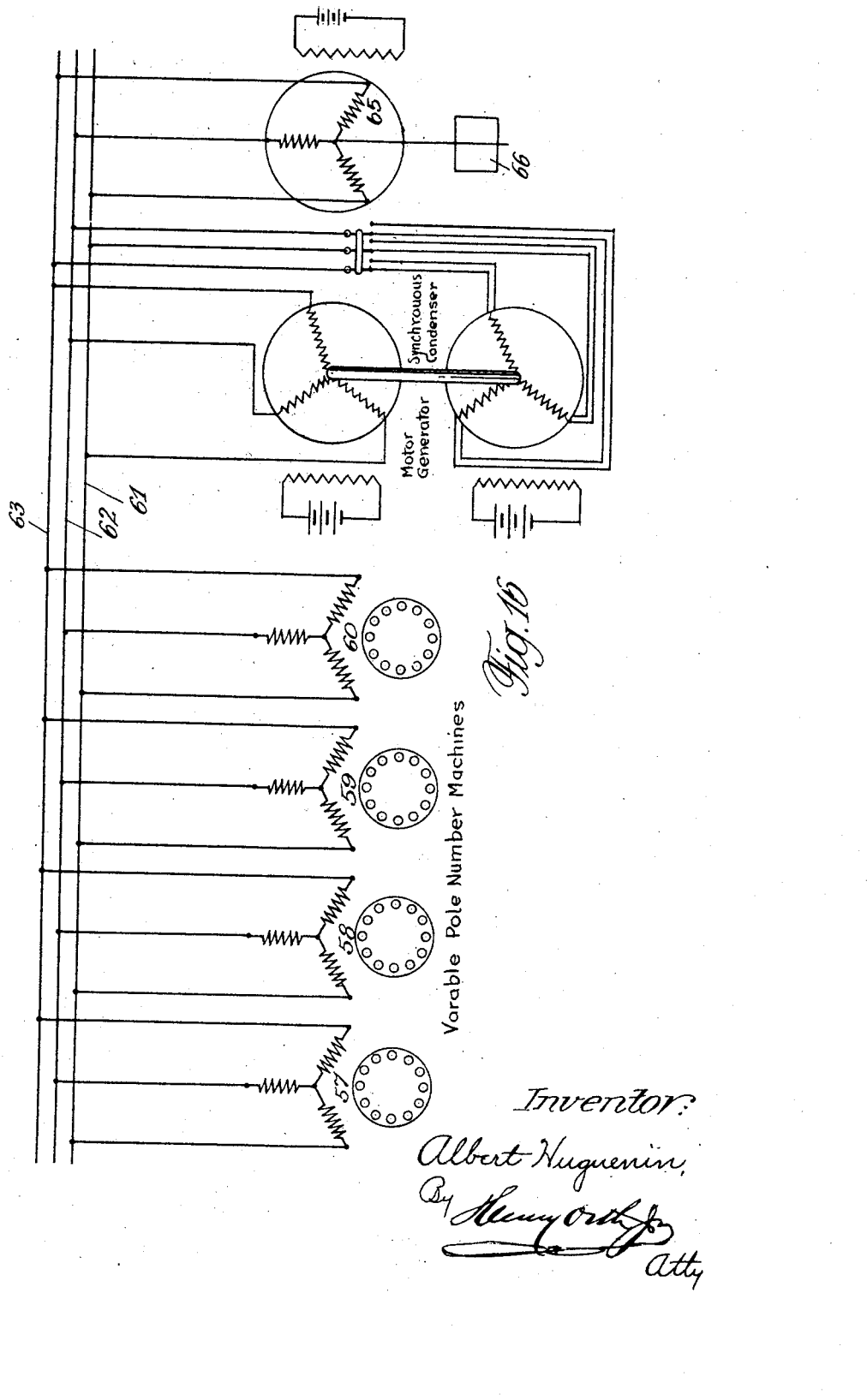

1,448,627

UNITED STATES PATENT OFFICE.

ALBERT HUGUENIN, OF ZURICH, SWITZERLAND.

TIDAL-WATER-POWER PLANT.

Application filed October 5, 1921. Serial No. 505,510.

*To all whom it may concern:*

Be it known that I, ALBERT HUGUENIN, citizen of the Republic of Switzerland, residing at Zurich, Switzerland, have invented certain new and useful Improvements in Tidal-Water-Power Plants, of which the following is a specification, reference being had therein to the accompanying drawing.

Most well thought out schemes for the practical exploitation of tidal water-power are, with very few exceptions, carried out by simply constructing a dam at the entrance of some bay of the sea, the water then flowing periodically in opposite directions through turbines built into the dam. Such an arrangement is well known to secure the greatest amount of work from the tidal water power, the intervals of inaction being of the shortest possible duration, so that the construction, taken as a whole might give rise to serious claims to being the only possible one. The turbine built into the dam must be made use of for both directions of flow. Proposals for constructing such turbines have already been made but the disadvantages attaching to them have been of such a kind as to render them incapable of yielding a practical and faultless solution of the problem of utilizing tidal water-power.

Thus it has already been proposed to utilize tidal action by means of axial-flow turbines interposed between two fixed sets of guide-blades with passages leading respectively from the sea and from an enclosed basin each to opposite sides of the turbines.

To obtain the greatest output of work possible by making use of the arrangement above mentioned it is necessary for the turbines to be worked with a variable head of water so that if as satisfactory a use as possible is to be made of the head available, a correspondingly variable number of revolutions for the turbines must be reckoned with. This fact involves the disadvantage that if the turbine be coupled directly to an electric current generator, the voltage and periodicity generated are not constant. To combat this drawback proposals have been made to employ the power plant fitted within the dam to feed a hydraulic accumulating installation which will be free to work with a head that is steady. But owing to the losses through friction in the pumps and the pipes a very considerable percentage of the energy derived from the tidal power plant becomes dissipated and in addition a special accumulating installation means a large increase in the capital necessary for erecting the plant and in the cost of generating a unit of current.

Further the supply passages in the dam and especially the channels of the turbine must be provided with shutoff devices to prevent the flow of the water until a difference in the water levels on opposite sides of the dam sufficient to drive the turbines has been reached. The number of these supply passages to be provided must be calculated on such a basis that, when a certain minimum head has been arrived at, which marks the lowest limit of useful working capacity of the turbines and the latter have therefore been put out of action, the difference in the water-levels (water-head) may be restored as quickly as possible so as to keep the period of inactivity in the generation of current as short as possible. The number of such supply passages must therefore be very large and the number of their shut off devices equally so, and the expense of these when balanced against the power gained is so high as to render it problematic whether it is worth while to build a tidal water power plant at all.

The object of the present invention is to remove the aforesaid drawbacks by a method of driving a tidal water power plant which permits of the generation of current of a constant voltage and frequency in the power station built within the dam, of the utilization in the most efficient and economical manner of the available water-power, and of an acceleration in the adjustment of the relative water levels so that the period of inactivity in the delivery of current is shortened and the number of devices required for purely shutting off purposes becomes greatly reduced.

The method employed according to the invention, for the working of a tidal water-power plant, having its motor engine built into a dam which acts so as to produce a concentration of the available water-head, consists in this that in each aggregate of the system, composed of asynchronous generators and turbines and for the purpose of rendering the current generated constant in voltage and in periodicity, the variation in speed of the turbine caused by a variation in the water-head, is counteracted by an alteration, in the working conditions of certain parts of the aggregates, while at the same time at least one synchronous condenser is made use of so as to avoid any undesirable low power factors and also at least one independently driven synchronous generator is employed for determining the periodicity, the operation being such that after a definite minimum water head has been reached first of all, those members of the turbine which actually impede the flow of the water are removed from the supply passage and the aggregate is then set to work as a motor-pump so as to effect a speedy re-adjustment of the water-level difference, after which the water passages between the dam and the turbine are closed by members of the turbine.

Preferably the alteration of the working conditions is effected by an alteration in the electrical connection of the asynchronous generators, which may be effected during the running of said generators.

Such an alteration of the electrical connections may consist of changing the connection of the poles or in the case of a transmission ratio 1:2 by establishing a cascade connection between two adjacent generators.

The designed form of turbine provided for carrying out these operations according to the method of the invention consists of an axial flow turbine furnished with two independent controllable guide-apparatus or distributors which can be put in or out of action, and only one of which, when working in one of the two directions of rotation is in action and the other out of action.

For the purpose of giving a completely free passage to the water through every turbine channel it is convenient that both guide-apparatus may be put out of action together.

Within the limits of control further, at least one of these apparatus may be completely shut down so that a water tight obturation of every turbine channel can be effected.

An example for the practical carrying out of this method of working is represented in the accompanying drawings, in which:

Fig. 1 is a vertical section taken longitudinally through the dam through two units of the system and Fig. 2 is a vertical section taken transversely to the dam through one unit.

Fig. 3 is a plan of Fig. 1.

Fig. 4 shows diagrammatically the position of the guide apparatus for one direction of rotation of the turbine when working.

Fig. 5 shows these guide-apparatus in the position occupied when the turbine is rotating in the other direction.

Fig. 6 represents both apparatus out of action for the purpose of securing a free through passage for the water and Fig. 7 shows both apparatus in closed position to effect a water-tight obturation of the turbine channels.

Fig. 9 is a plan of one half of the turbine in which two guide vanes marked A are shown in a section along line I—I of Fig. 8, two guide vanes marked B are shown in a section along line II—II of Fig. 8 and four vanes marked C are shown in a section along line III—III of Fig. 8.

Fig. 10 is a detail of a device for securing a guide vane in its operative position.

Figs. 11 and 12 are diagrammatical sketches of the poles of a generator connected in different ways.

Figs. 13 and 14 represent in a diagrammatic manner two adjacent generators connected in cascade.

Fig. 15 shows diagrammatically a synchronous condenser working on the electric system.

Fig. 16 shows in a diagrammatic manner four generators, a synchronous generator and a synchronous condenser working on the mains of a station.

Figure 8:
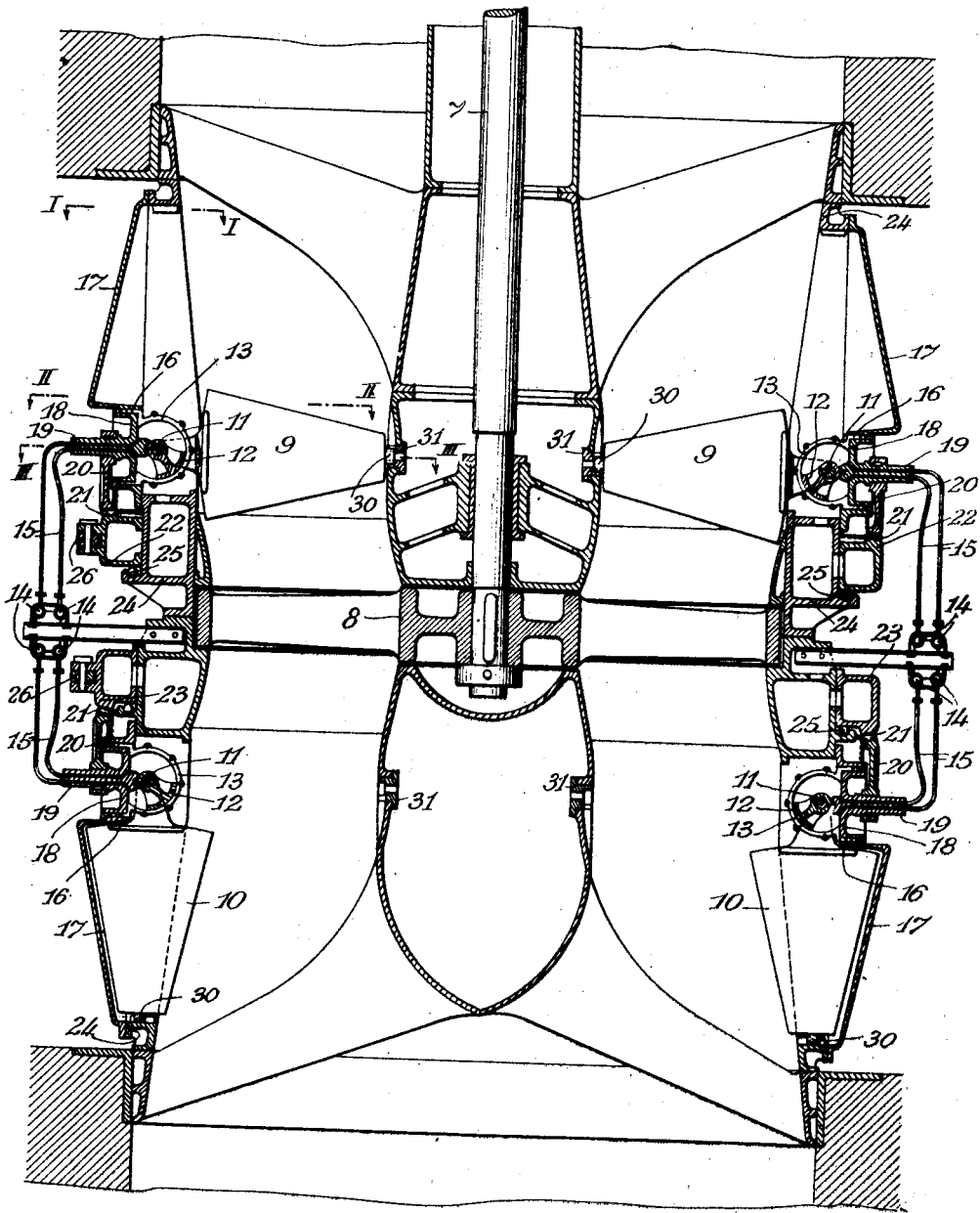
Fig. 8 is a longitudinal vertical section through the turbine.

In the drawings, 1 and 2 denote two turbines which act on a common asynchronous generator 3 by means of the spur-gear 4, 5 and 6. The turbines themselves are of the axial flow type and are provided with one upper and one lower guide apparatus, the rotary blades 9 and 10 of which pivoting round horizontal axes permit of an exact regulation of the load of the turbines. In the one direction of flow only one of the guide apparatus is operative, for example the upper one 9 (Fig. 4) with the direction of flow downwards and the lower one 10, (Fig. 5) with flow upwards. The blades of the inoperative apparatus are, by means of a suitable contrivance which is described hereinafter, turned out of the passages of the axial turbines and take up the temporary position represented in the drawing.

Referring to Figs. 8 and 9, 7 denotes the vertical shaft to which the runner 8 is rigidly fixed. The rotary vanes 9 and 10 of the upper and lower guide apparatus respectively are adapted to be rotated about the axles 11 for the purpose of being able to rotate the blades out of the water passage in which the parts of the turbine are arranged. In Fig. 8 the lower blades 10 are shown in the position into which they have been rotated in a downward direction. The contrivance for effecting this rotation of the guide blades is worked by fluid pressure in the following manner: A segment shaped piston 12 is rigidly fixed to the axle 11 and is enclosed in a casing 13. Pressure fluid can be supplied from either of the two main conduits 14 through two small pipes 15 leading to either side of the segment piston 12 of each guide blade—one of the pipes 15 and one of the main conduits 14 acting as escape for the pressure fluid whilst the latter is supplied to the other pipe and conduit. The fluid pressure causes a turning of the piston 12 inside the casing 13 and thereby of the guide blade in the desired manner. The foundation ring 24 is provided with apertures for taking up each guide blade in its turned position which apertures are closed by covers 17.

The turning motion of the guide blades around horizontal axes is effected from shaft 29 by a suitable automatic speed governor of any known type not shown in the accompanying drawings. To this end the axle 11 together with the casing 13 is rotatably mounted by means of a cylindrical portion 16 of the casing 13 guided in a cylindrical portion of the cover part 17. The opposite end of a guide blade is provided with a pin 30 which is supported in a bearing 31. The pin 30 is hollow and a spring loaded pin 32 is provided (shown in detail in Fig. 10) and adapted to enter into the hollow part of pin 30 for securing the pin 30 of the blade in position. The disengagement of pins 32 and 30 is caused by fluid pressure. Inside the cylindrical portion 16 a cover 18 is provided which is fitted with a central extension 19 through which the bores leading to the pipes 15 pass. To that central extension 19 a toothed segment 20 is rigidly fixed, all the segments 20 for the blades of the upper guide apparatus being in engagement with the toothed part 21 of a regulating ring 22, while the segments 20 for the blades of the lower guide apparatus are actuated by a regulating ring 23. The regulating rings 22 and 23 are centrally guided on the frame 24 of the turbine, the load of the rings being supported on balls 25. If now the regulating ring of the guide apparatus the blades of which are in the operative position and which is linked by links 26 and 27 to a bell-crank lever 28 fitted to the vertical governor shaft 29 is turned around the axis of the turbine upon a turning motion being imparted to shaft 29 by the automatic speed governor all the guide blades will turn about their horizontal axes and will regulate the water passage between adjacent blades. A complete closing of the water passage can be effected by the guide blades.

When it is desired to completely open the water passages then the blades 9 and 10 of both guide apparatus are rotated out of the passage, as illustrated in Fig. 6, and there remains only the turbine rotor wheel, which as indicated above may be made use of as an axial pump. If, lastly, it be desired to close the passage completely then both guide apparatus are swung around into their operative position and then both closed (Fig. 7) whereby a perfectly water-tight obturation of the passage in question results.

The operation of the tidal water-power plant is as follows the assumption being made that the minimum head at which the turbine has to work averages about 1 meter.

Turbines and generators run in one direction with a somewhat high revolution number depending on the rather large head. This head diminishes slowly so that the turbine has to be dropped to a lower speed, the voltage and periodicity of the current generated being maintained constant by changing the connection of the poles of the generator or in the case of a transmission ratio of 1 to 2, by establishing a cascade connection between two adjacent generators, i. e., by altering the working conditions of certain parts of the aggregate.

The means for changing the connection of the poles for the purpose of varying the numbers of poles in a generator and for establishing a cascade connection between two adjacent generators are well known as such and the Figs. 11–14 of the drawings which are an illustration thereof are only diagrammatic sketches. In a generator which permits of changing the connections of the poles the ends of the field coil windings are connected together in groups in circuits for instance corresponding to a four pole generator (Fig. 11) whilst other circuits are provided by means of which said windings are connected to correspond to a six pole generator (Fig. 12). By switching the circuits of one type in and cutting out the circuits of the other type six or four poles will be operative in the generator.

In Fig. 13 a cascade connection between two adjacent generators is shown wherein 40, 41, 42 are the star connected stator windings of the first generator, that works on the mains of the system while the star-connected stator windings 43, 44, 45, of the adjacent second generator are connected up to the slip-rings 46, 47, 48 of the first generator, and the rotor of the second generator is short-circuited at its slip-rings 49, 50, 51.

The cascade connection of the two adjacent generators illustrated in Fig. 14 differs from that shown in Fig. 13 inasmuch as the rotor slip-rings 49, 50, 51 of the second generator are connected up to the slip-rings 46, 47, 48 of the first generator, while the stator windings 43, 44, 45 of the second generator are short-circuited. Then arrives the moment when the head measures are only about 1 metre whereupon the generator must be disconnected. At this moment also the guide apparatus that is operative is put out of action and the generator converted to the motor by reducing its revolution number below the synchronous speed.

The speed of the generator, as compared to the synchronous speed, can easily be varied by the governor within the limits of 5% above or below, such range being more than sufficient to run it up to full load as generator and have it running as motor up to full absorption too. Indeed, generally, an over-speed of 3% is sufficient and a slip of 4% for the running as motor. When adjusted to a slip of 4% as set forth above the entire aggregate continues running as motor and pump in the same direction as the generator did previously. As soon as the two water-levels on opposite sides of the dam are adjusted or, in practice, shortly before then the guide-apparatus are both closed and the motor is now only driving the wheel idly between two closed walls, and may, at the engineer's leisure during the interval that now ensues, be reversed so as to rotate in the other direction, that is, it may be first stopped and then started to run in the other direction. As soon as about 1 metre of head is available the set rotates as a motor in the new direction and it is only necessary to turn the outlet guide-apparatus completely away and to open the inlet guide-apparatus to correspond in order to have the set running again as a turbine-generator, immediately the revolution number has been raised above that of the synchronous speed. As the head increases the aggregate continues to run thus and as soon as the head necessitates an increase in the revolution number of the turbine, this may be at once effected, the voltage and periodicity being maintained constant by the operations specified above and the aggregate again acting as a turbine-generator running with a high number of revolutions.

For the purpose of equalizing unfavourable low power factors in the asynchronous generators, suitable synchronous condensers are provided and at least one synchronous generator must act on the whole system so as to fix the periodicity.

The means for equalizing unfavorable low power factors, the so-called synchronous condensers are well known and consist of over-excited synchronous generators running nearly at no load and producing the important wattless current to correct the power factor of the system which would be very low using only asynchronous generators. These synchronous generators can be driven by small asynchronous motors or by any suitable prime mover available in the spot.

A synchronous generator driven by a motor is diagrammatically illustrated in Fig. 15. In this construction the stator winding 54 of the generator 52 and the stator winding 55 of the motor 53 are formed and arranged in the manner of the windings of a static regulating transformer so that the stator winding of the motor which is provided with tappings 56 forms the primary winding and the secondary winding being formed by the stator winding of the synchronous generator; in this way any transmission ratio between motor and generator within the number of regulating coils may be obtained.

In Fig. 16 the electrical part of a power station is diagrammatically illustrated. 57, 58, 59 and 60 denote four asynchronous generators working on the mains 61, 62, 63. 64 is the motor generator illustrated in Fig. 15 for equalizing unfavorable-low power factors and 65 is the synchronous generator adapted to fix the periodicity of the system and being driven by an independent prime-mover 66.

The advantages attaching to such a tidal water-power plant are as follows:—

The guide-apparatus which can be put in and out of action and can also be regulated, produce a turbine of the best efficiency and adapted also to be well and easily regulated resulting therefore in a highly efficient utilization of tidal water-power.

Owing to the fact that the closing of the turbine channels can be effected by the guide-apparatus themselves a great saving is reached in the outlay for shut-off devices.

The putting out of action of the guide-apparatus produces a water passage through the dam in which the idle running-wheel offers only a slight resistance to the water flowing through. When the difference between the water-levels is quite small or just before re-adjustment must take place the volume of water flowing in this passage is increased by the running wheel working as a pump and the interval necessary for re-adjusting the water-levels is thus shortened. The employment of asynchronous generators is advantageous because no connecting in parallel is necessary and because by merely altering the number of revolutions so as to be above or below the revolution number of the synchronous generator, they may be made to act either as generators or motors.

I claim:

1. A method of working a tidal water power plant comprising a dam having supply passages, at least one aggregate including a turbine adapted to run in both directions and located in a supply passage and comprising guide vanes and a runner, and an asynchronous generator, which method comprises counteracting the variation in the speed of the turbine occasioned by a variation in the available head of water in order to generate a current of constant voltage and periodicity in the aggregate, causing the speed of the aggregate to drop below synchronous speed to operate the aggregate as a motor pump, and closing the supply passages after a correct difference of water levels has been reached.

2. A method of working a tidal water power plant comprising a dam having supply passages, at least one aggregate including a turbine adapted to run in both directions and located in a supply passage and comprising guide vanes and a runner, and an asynchronous generator, which method comprises counteracting the variation in the speed of the turbine occasioned by a variation in the available head of water in order to generate a current of constant voltage and periodicity in the aggregate, removing the flow-impeding guide vanes after a definite minimum head of water has been reached, causing the speed of the aggregate to drop below synchronous speed to operate the aggregate as a motor pump, and closing the supply passages after a correct difference of water levels has been reached.

3. A method of working a tidal water power plant, comprising a dam having supply passages, at least one aggregate including a turbine adapted to run in both directions and located in a supply passage and comprising a runner and two groups of guide vanes disposed at the two ends of the runner, and an asynchronous generator; which method comprises counteracting the variation in the speed of the turbine occasioned by a variation in the available head of water in order to generate a current of constant voltage and periodicity in the aggregate, removing the flow-impeding guide vanes after a definite minimum head of water has been reached, causing the speed of the aggregate to drop below synchronous speed to operate the aggregate as a motor pump, moving the guide vanes back into the supply passages, and adjusting the guide vanes after a correct difference of water levels has been reached so as to close the supply passages.

4. In a tidal water power plant, in combination, at least one aggregate composed of an asynchronous generator and a turbine, means adapted to alter the electrical connections of said generator for compensating the variation of speed occasioned by the variations in the water level, two controllable guide apparatus for said turbine, means to render one of same operative when the turbine works in the one of the two rotary directions and to render the other inoperative by removing it from the supply passages to the turbine.

5. In a tidal water power plant, in combination, at least one aggregate composed of an asynchronous generator and a turbine of the axial type, means adapted to alter the number of operative poles in said generator by altering the electrical connections for the purpose of compensating the variation of speed occasioned by the variation in the water level, two controllable guide apparatus for said turbine, means to render one of same operative when the turbine works in the one of the two rotary directions and to render the other inoperative by removing it from supply passages to the turbine.

6. In a tidal water power plant, in combination, at least one aggregate composed of an asynchronous generator and a turbine of the axial type, means adapted to alter the number of operative poles in said generator by altering the electrical connections for the purpose of compensating the variation of speed occasioned by the variation in the water level, two controllable guide apparatus for said turbine, means adapted to render one of said guide apparatus operative when the turbine works in the one of the rotary directions and to render the other guide apparatus inoperative by removing it from the supply passages to the turbine and to remove both guide apparatus for giving a perfectly free passage to the water through the turbine channel, and means adapted to influence the operative apparatus by a speed governor.

7. In a tidal water power plant, in combination, at least one aggregate composed of an asynchronous generator and a turbine of the axial type, means adapted to alter the electrical connections of said generator for compensating the variation of speed occasioned by the variation in the water level, at least one synchronous condenser for avoiding undesirable low power factors, at least one independently driven synchronous generator for determining the periodicity, two controllable guide apparatus for said turbine, means adapted to render one of said guide apparatus operative when the turbine works in the one of the rotary directions and to render the other guide apparatus inoperative by removing it from the supply passages to the turbine and to remove both guide apparatus for giving a perfectly free passage to the water through the turbine channel and to effect a watertight closing of every turbine supply passage by completely closing at least one of said guide apparatus.

In testimony whereof I affix my signature.

ALBERT HUGUENIN.